(12) United States Patent
Yang et al.

(10) Patent No.: US 10,292,529 B2
(45) Date of Patent: *May 21, 2019

(54) SLOW COOKER AND LOCKING ASSEMBLY

(71) Applicant: MIDEA GROUP CO., LTD., Foshan (CN)

(72) Inventors: Guoqing Yang, Foshan (CN); Jianfeng Li, Foshan (CN); Jinshui Wu, Foshan (CN); Pingtao Chen, Foshan (CN)

(73) Assignee: MIDEA GROUP CO., LTD., Foshan (CN)

( * ) Notice: Subject to any disclaimer, the term of this patent is extended or adjusted under 35 U.S.C. 154(b) by 997 days.

This patent is subject to a terminal disclaimer.

(21) Appl. No.: 14/609,187

(22) Filed: Jan. 29, 2015

(65) Prior Publication Data

US 2015/0201801 A1    Jul. 23, 2015

Related U.S. Application Data

(62) Division of application No. 13/659,033, filed on Oct. 24, 2012, now Pat. No. 8,985,372.

(30) Foreign Application Priority Data

Oct. 25, 2011  (CN) .................... 2011 2 0411145 U

(51) Int. Cl.
*A47J 27/08* (2006.01)
*B65D 25/28* (2006.01)
*A47J 36/10* (2006.01)

(52) U.S. Cl.
CPC ........... *A47J 36/10* (2013.01); *A47J 27/0811* (2013.01); *B65D 25/28* (2013.01); *B65D 2525/283* (2013.01)

(58) Field of Classification Search
CPC ........ A47J 36/10; A47J 27/08; A47J 27/0804; A47J 27/808; A47J 27/0811; A47J 27/0813; A47J 27/0815

(Continued)

(56) References Cited

U.S. PATENT DOCUMENTS 1,080,906 A    12/1913 Ford
1,207,974 A    12/1916 Miller (Continued)

FOREIGN PATENT DOCUMENTS

CN    201542396 U    8/2010
CN    101036559 B    12/2010

*Primary Examiner* — Anthony D Stashick
*Assistant Examiner* — Kaushikkumar A Desai
(74) *Attorney, Agent, or Firm* — Kilpatrick Townsend & Stockton, LLP

(57) ABSTRACT

The present invention relates to cooking utensils. The present invention provides a slow cooker and a locking assembly that have simple and practical structure, easy to clean and can engage the lid with the liner container for preventing spillage of cooking content such as soup. The structure comprises a container, a lid and a locking assembly. The locking assembly retains the lid on the opening of the container. The container has a rim projecting outside at the opening. The locking assembly comprises a connector disposed on the lid for engaging the lid with the opening of the container, and locking end components provided at ends of the connector for engaging with the rim of the liner container. Using the locking assembly to retain the lid in sealing engagement with the opening of the container, the slow cooker can effectively engage the lid with the container.

5 Claims, 15 Drawing Sheets

(58) Field of Classification Search
USPC .......... 215/273; 219/433; 220/315, 318–319, 220/322–324, 326, 573, 912; 24/285, 24/298, 300, 302; 292/100, 194–195, 292/198, 200, 256, 951, 95–96, DIG. 11; 70/18–19
See application file for complete search history.

(56) References Cited

U.S. PATENT DOCUMENTS

| | | |
|---|---|---|
| 1,483,255 A | 2/1924 | Tonge |
| RE17,398 E | 8/1929 | Kircher |
| 1,765,135 A | 6/1930 | Eben |
| 2,542,621 A | 2/1951 | Bober |
| 2,556,900 A | 6/1951 | Forrest |
| 2,893,771 A | 7/1959 | Claud-Mantle |
| 3,746,205 A | 7/1973 | Helguera |
| 4,522,436 A | 6/1985 | Hoen et al. |
| 5,257,839 A | 11/1993 | Nielsen et al. |
| 5,462,318 A | 10/1995 | Cooke |
| D388,657 S | 1/1998 | Bacharowski |
| 6,041,721 A | 3/2000 | Weston |
| 6,179,350 B1 | 1/2001 | Ely et al. |
| 8,342,575 B2 | 1/2013 | Coleman et al. |
| 2002/0153378 A1 | 10/2002 | Bianco et al. |
| 2007/0210061 A1 | 9/2007 | Tynes et al. |

Connector (Y shape)

Connector (H shape)

SLOW COOKER AND LOCKING ASSEMBLY

CROSS-REFERENCE TO RELATED APPLICATION

The present application claims is a division of U.S. application Ser. No. 13/659,033, filed Oct. 24, 2012, which benefit from Chinese utility model application no. 201120411145.2 filed on Oct. 25, 2011 by Midea Group Co., Ltd. The entire disclosure of the above applications is hereby incorporated herein by reference.

FIELD OF THE INVENTION

The present invention relates to a slow cooker and its locking assembly and, in particular, to a slow cooker that is capable of preventing spillage of cooking content such as soup.

BACKGROUND OF THE INVENTION

Conventional slow cooker comprises a liner container and a lid disposed on the top rim of the container. The lid is typically not securely engaged with the container. The user is likely to move the cooker or the liner container containing food after the food is well cooked. The lid tends to slide off during movement because there is no secure connection between the liner container and the lid. Furthermore, the shaking caused by the movement can possibly cause spillage of the liquid content in the container, and thus may burn the user.

Chinese patent no. CN 200920198406.X discloses a slow cooker having a touch control panel, which comprises a working pot covered by a lid. A handle comprised of an upper part and a lower part is symmetrically fixed near the top edge of working pot. A spring hole is arranged in the middle of the lower part for accommodating a spring and a steel bead. A latch is slidably arranged between the upper and lower parts, and the movement of the latch is limited by the steel bead. A closed sealing ring, made of silicon gel, is arranged below the periphery of the lid to achieve seal connection between the lid and the working pot. The latch provided between the working pot and the lid is used to seal the working pot. However, this design has too many parts, resulting in high cost and difficulty of assembly. Moreover, the latch is subject to large area of friction, causing non-smooth operation. Further, the steel bead is positioned by the elastic force of the spring which may deteriorate during long term use, resulting in high possibility of latch release.

Chinese patent no. CN 200710005602 discloses a slow cooker comprising a housing, a container and a lid. The lid includes a gasket around an outer edge thereof and is shaped and sized to cover the opening of the container. At least one over-the-center clip is mounted to the side all of the housing, the clip being selectively engageable with the lid to retain the lid in sealing engagement with the container, in order to inhibit leakage of the food stuffs from the interior of the container. The clip includes a hook and a lever, the hook being selectively engageable with the lid to selectively retain the lid in sealing engagement with the container. A catch has to be provided to the lid in order to engage the hook of the clip. This will lead to additional cost and more complicated manufacturing process for mounting such a catch, particularly on a glass lid as predominately used in slow cookers.

Additionally, the locking structure in the above disclosed slow cookers are fixed on the housing or container and can not be disassembled or be used for other slow cookers. The locking structure can not be easily repaired or replaced, resulting in a poor versatility.

SUMMARY OF THE INVENTION

An object of the present invention is to provide a slow cooker that has simple and practical structure, easy to clean and can engage the lid with the liner container for preventing spillage of cooking content such as soup.

A further object of the present invention is to provide a slow cooker component, that is, a locking assembly, for engaging the lid with the liner container.

A third object of the present invention is to provide a locking assembly for engaging the lid with the liner container which is easy to repair or replace.

A forth object of the present invention is to provide a universal locking assembly for cooking utensils, which can be used for multiple cooking utensils.

To achieve the above objects, the present invention provides a slow cooker comprising a liner container, a lid and a locking assembly. The locking assembly retains the lid on an opening of the liner container. The liner container has a rim projecting outside at the opening. The locking assembly comprises a connector disposed on the lid for engaging the lid with the opening of the liner container, and locking end components provided at ends of the connector for engaging with the rim of the liner container.

Using the locking assembly to retain the lid in sealing engagement with the opening of the liner container, the slow cooker according to the present invention can effectively seal the lid with the liner container, ensuring that the lid would not slide off when moving the slow cooker and that the soup liquid would not spill over when the slow cooker is being shaken. Additionally, the rim of the opening in conventional liner containers can be effectively used in the present structure, such that there is no need to add any other structure to the liner container or the housing, which ensures certain versatility. The rim is a ring disposed outside of the opening of the liner container, with the same thickness in every position, so the lid can be freely engaged with any position of the rim, which may facilitate the user. The locking assembly compresses the lid with its main body and retains the lid in sealing engagement with the liner container, which can equally distribute the engaging force all over the lid, so as to improve the sealing effect and make it suitable for conventional glass or metal made lid.

The slow cooker comprises at least one locking assembly detachable from the liner container and the lid. Based on the size of the lid, more than one locking assembly can be applied to the lid to improve the sealing effect. Since the locking assembly is a structure independent from the liner container or the lid, the locking assembly can be produced alone and there is no need to add any other component to the liner container or the lid, which reduces the difficulty of producing and is easy to clean, repair or replace.

It is preferable for a common slow cooker that, the slow cooker comprises one elongated locking assembly disposed on the lid.

In a common slow cooker, the liner container and the lid are circular or oval and the lid has a handle. When the liner container and the lid are both circular, the locking assembly is disposed along a diameter of the lid. When the liner container and the lid are both oval, the locking assembly is disposed along a long axis or a short axis of the lid A hole is provided in a center of the locking assembly for passing through of the handle. Such design can ensure a big contact area between the main body of the locking assembly and the lid. It also can ensure that the locking force is equally distributed over the lid, avoiding a centralized pressure on the lid and high material requirement. The hole provided in a center of the locking assembly for passing through of the handle, can facilitate the positioning of the locking assembly and can prevent it from moving left and right on an oval lid so as to facilitate the user. The user only needs to put the locking assembly around the handle and then engage the lid with the liner container. There is no need to make any special positioning operation.

Each of the locking end components can comprise a locking button and a hook, wherein the hook has an upper end rotatablely connected with the locking button, and a lower end provided with a lock position for engaging with the rim of the liner container. The locking button has one end rotatablely connected with the connector with the other end free. This kind of structure is simple and easy to produce. It can provide a large engaging force and can effectively engage the lid with the liner container.

Another structure of each of the locking end components comprises an unlocking button connected with the connector by a first pin and a lock connected with the connector by a second pin. An elastic support sheet or a torsion spring is disposed under the unlocking button for retaining the unlocking button in a locking state, and a torsion spring is disposed under the lock for retaining the lock in an unlocking state. The lock has a free upper end, and a lower end provided with a lock position for engaging with the rim of the liner container. The unlocking button has a front support block as a front end for supporting the free upper end of the lock, and a free rear end.

Although this kind of structure is relatively more complicated, it is easier to use because the lid can be retained on the liner container when the front end of the unlocking button is pushing the lock. To engage the lid with the liner container, the lower end of the elastic lock can be pushed down, pressing the lock position to be engaged with the rim of the liner container. Under the force of the elastic support sheet or the torsion spring, the front end of the unlocking button can automatically move to a locking position and pushes the upper end of the elastic lock, so as to engage the lid with the liner container. Through the whole locking process, each elastic lock structure only need to be pressed one by one, making the operation very easy. To unlock the lid with the liner container, the free end of the unlocking button can be pressed down and the front support block moves upward. The upper end of the elastic lock is no longer supported by the front support block of the unlocking button, so the lock position in the lower end moves upward under the force of the torsion spring, so as to unlock the lid with the liner container. This press-to-unlock pattern is different from the conventional pull-to-unlock pattern and avoids the potential for the finger to touch the lid, reducing the risk that the finger may be scalded due to misoperation.

To make one locking assembly suitable for slow cookers of different size, each of the locking end components according to the present invention is connected with the connector by a positioning structure. The length of the locking assembly can be adjusted by adjusting the positioning structure, which makes the locking assembly suitable for different slow cookers.

The present invention also provides a locking assembly detachable from the liner container and the lid. The locking assembly comprises a connector disposed on the lid for engaging the lid with the opening of the liner container, and locking end components provided at ends of the connector for engaging with the rim of the liner container. The independent locking assembly has advantages as described above, and it has wide applicability and can be used for different cooking utensils.

The main body of the locking assembly has an elongated shape, or a Y shape or an H shape. A hole is provided in a center of the locking assembly for passing through of the handle, and each of the locking end components is connected with the connector by a positioning structure used for adjusting length of the locking assembly. When the structure has an elongated shape, it has two ends. When the structure has a Y shape, as shown in FIG. 18, it has three ends. When the structure has an H shape, as shown in FIG. 18, it has four ends. The ends are connected with the locking end components for engaging with the rim of the opening of the liner container or the housing. The ends also have positioning structures used for adjusting the length of the locking assembly.

Each of the locking end components also can be designed as anyone of the above two structures, which means that, each of the locking end components can comprise a locking button and a hook, wherein the hook has an upper end rotatablely connected with the locking button, and a lower end provided with a lock position for engaging with the rim of the liner container. The locking button has one end rotatablely connected with the connector with the other end free.

Each of the locking end components can also comprise an unlocking button connected with the connector by a first pin and a lock connected with the connector by a second pin. An elastic support sheet or a torsion spring is disposed under the unlocking button for retaining the unlocking button in a locking state, and a torsion spring is disposed under the lock for retaining the lock in an unlocking state. The lock has a free upper end, and a lower end provided with a lock position for engaging with the rim of the liner container. The unlocking button has a front support block as a front end for supporting the free upper end of the lock, and a free rear end.

In summary, the slow cooker according to the present invention can effectively engage the lid with the liner container, ensuring that the lid would not slide off when moving the slow cooker and that the soup liquid would not spill over when the slow cooker is being shaken. It also has convenient operation, stable performance and high reliability. The locking assembly is an independent structure, so it is easy to produce, and convenient to clean, repair or replace, making it with high versatility and can be used for slow cookers of different size or other cooking utensils. This shows that compared to the prior art, the present invention has substantive features and advancements and therefore has creativity.

The above figures do not completely show components unrelated to the present invention.

DETAILED DESCRIPTION OF PREFERABLE EMBODIMENTS

The present invention is further described in reference to the figures and embodiments.

Embodiment 1

Figure 1:
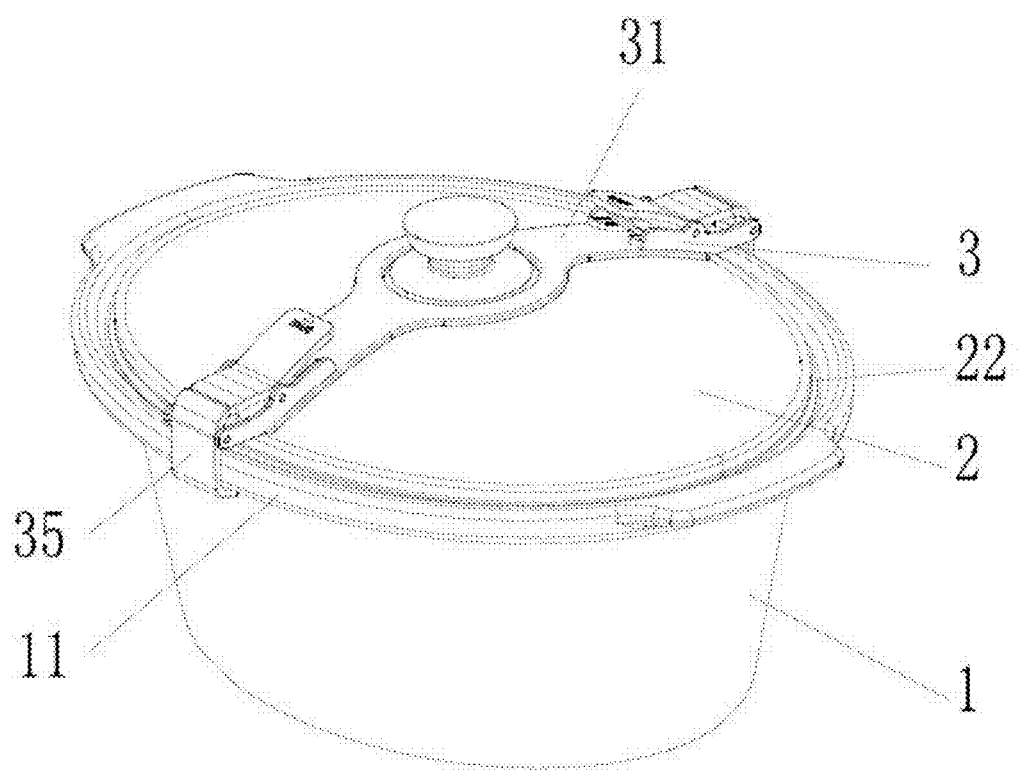
FIG. 1 is a schematic view of a first embodiment of the slow cooker (not showing the housing).

FIG. 1 shows a slow cooker comprising a housing (not shown), a liner container 1, a lid component 2 and a locking assembly 3. The liner container 1 is disposed within the housing. The lid component 2 is disposed on the liner container and covers the opening of the liner container 1. The lid component 2 has a handle. A sealing ring 22 is disposed along the outer edge of the lid component 2. The locking assembly 3 includes a connector 31 and two locking end components respectively connected with the connector 31. The connector 31 is disposed on the lid. The locking end components respectively can selectively engage with the rim 11 of the liner container 1, limiting the movement of the lid component 2.

Figure 2:
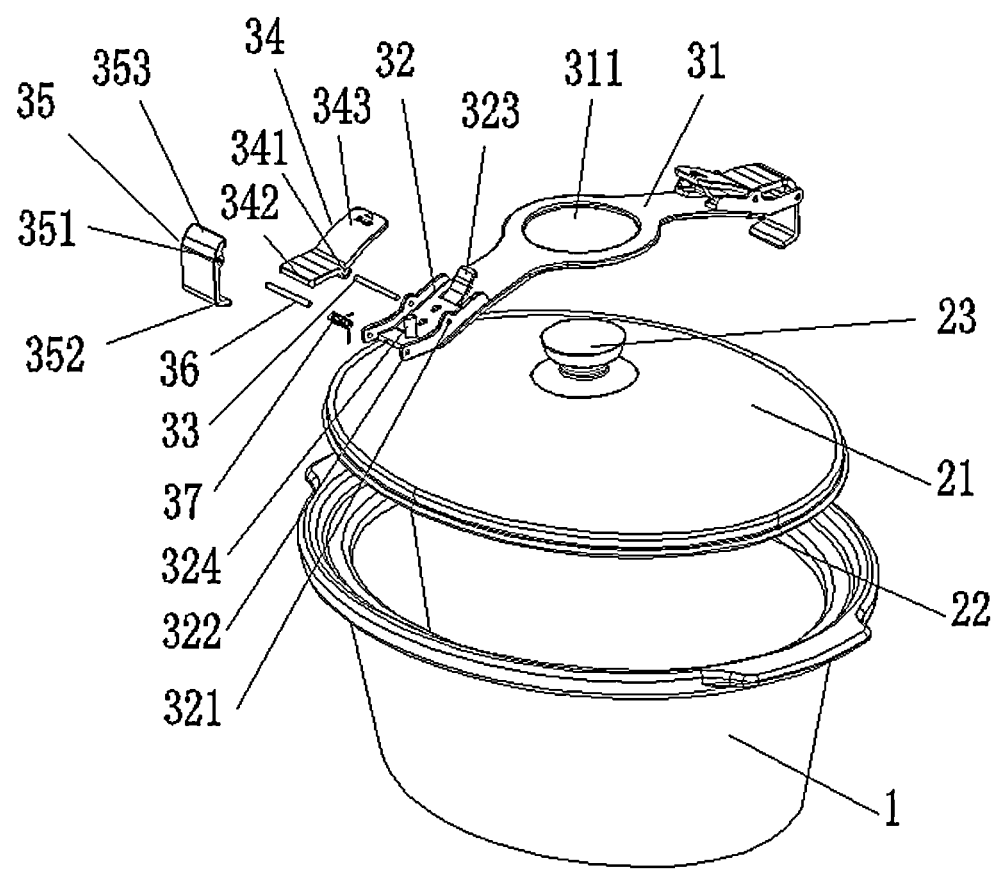
FIG. 2 is an exploded view of the first embodiment of the slow cooker.

As shown in FIG. 2, the lid component 2 further includes, but not limited to, a lid 21, a lid handle 23 and a sealing ring 22. Under the pressing of the locking assembly 3, the lid component 2 forms a confined space together with the liner container 1.

Each of the locking end components comprises a locking seat 32, a first pin 33, an unlocking button 34, a lock 35, a second pin 36 and a torsion spring 37. The locking seat 32 has a first pin hole 321 arranged in the center thereof, a second pin hole 322 arranged in the end that is far from the connector 31, a elastic support sheet 323 arranged in the end that is close to the connector 31, and a rigid support pillar 324 arranged in the center. The unlocking button 34 has a button pin hole 341 disposed in the center thereof, and the unlocking button is connected with the locking seat 32 by the matching of the first pin 33, the button pin hole 341 and the first pin hole 321, allowing the unlocking button to rotate within a certain range. The lock 35 has a lock pin hole 351 disposed in the center thereof, and the lock is connected with the locking seat 32 by the matching of the second pin 36, the lock pin hole 351 and the second pin hole 322, allowing the lock to rotate within a certain range. The torsion spring 37 is disposed around the second pin 36, with one leg fixed on the locking seat 32, and another leg fixed on the lock 35. The lock 35 can be retained in an opening state by the elastic force provided by the torsion spring 37.

The connector 31 has a hole 311 in the center, keeping away from the lid handle 23 and saving space. The two ends of the connector 31 respectively fit with the locking seat 32 by the matching of a buckle and a slot, or a rivet and a rivet hole.

The present embodiment locks and unlocks the lid component 2 with the liner container 1 in ways as follows.

Figure 3:
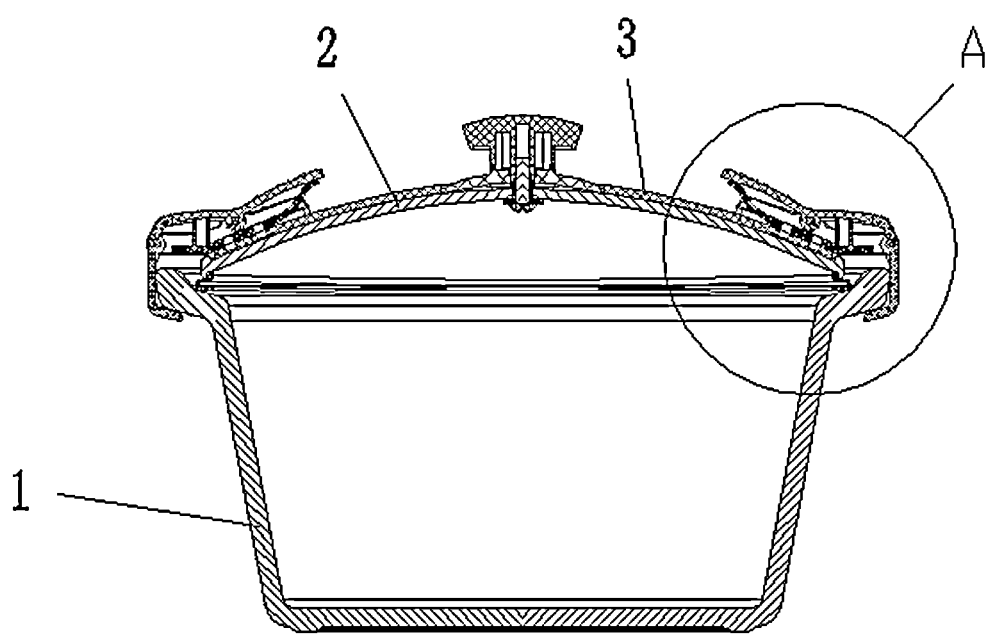
FIG. 3 is a cross-sectional view of the first embodiment of the slow cooker when the lid is in a locking state.
Figure 4:
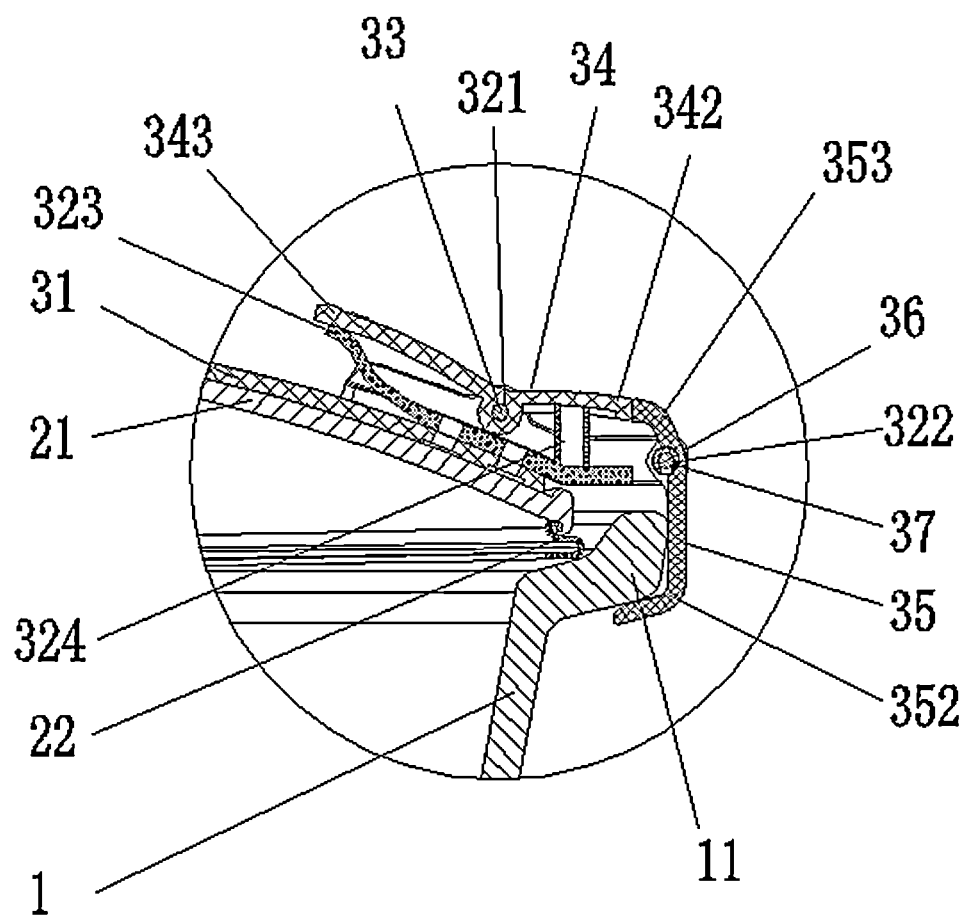
FIG. 4 is an enlarged view of portion A in FIG. 3.

As shown in FIGS. 3 and 4, in a locking state, the locking assembly 3 is disposed on the lid component 2. The lock 35 is stuck in the second pin hole 322 of the locking seat 32 by the second pin 36. The torsion spring 37 provides a pre-stressing force for the lock 35 to rotate to open. The unlocking button 34 is stuck in the first pin hole 321 of the locking seat 32 by the first pin 33. A front support block 342 of the unlocking button which is far from the center of the connector 31 forms an interference with an arcuated support block 353 in the upper end of the lock 35, counteracting the prestressing force of the lock 35 to rotate to open and preventing the lock 35 from opening. Then the locking assembly 3 compresses the lid component 2, thus the sealing ring 22 is compressed. The liner container 1, the lid component 2 and the sealing ring 22 form a confined space by the elasticity of the sealing ring 22, so as to inhibit leakage of soup and drop of the lid component 2.

Figure 5:
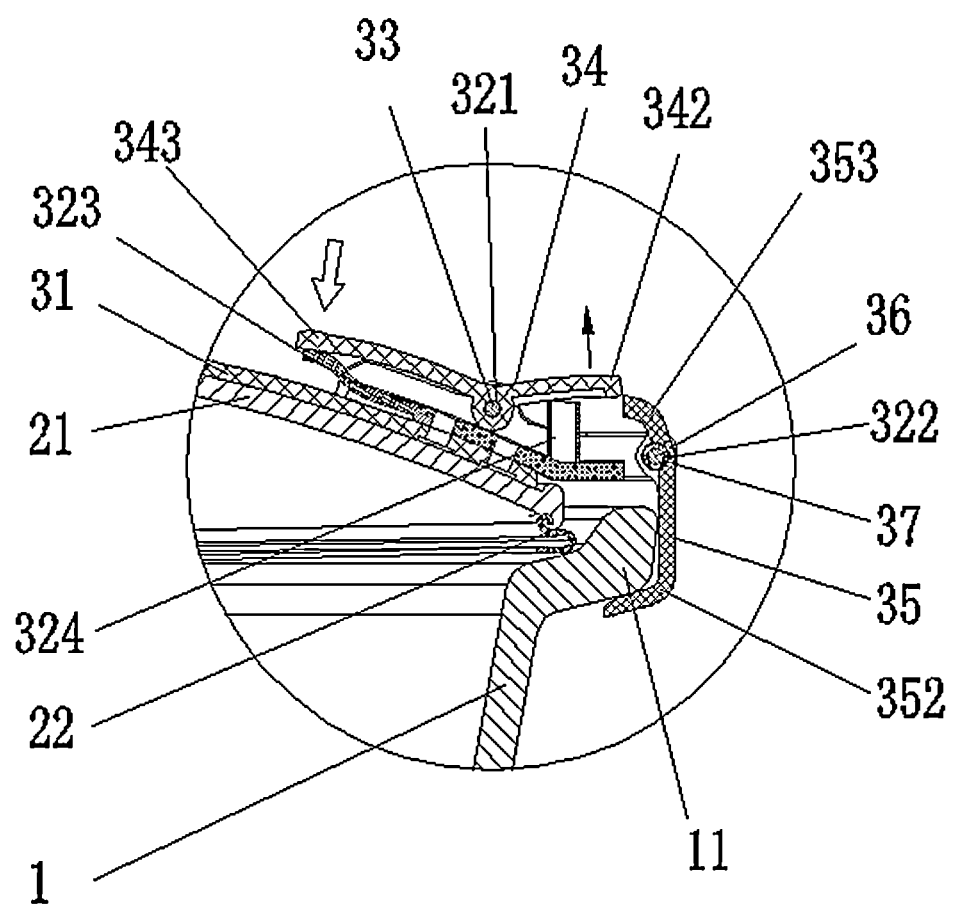
FIG. 5 is a cross-sectional partial view of the first embodiment of the slow cooker when the unlocking button is pressed to unlock.
Figure 6:
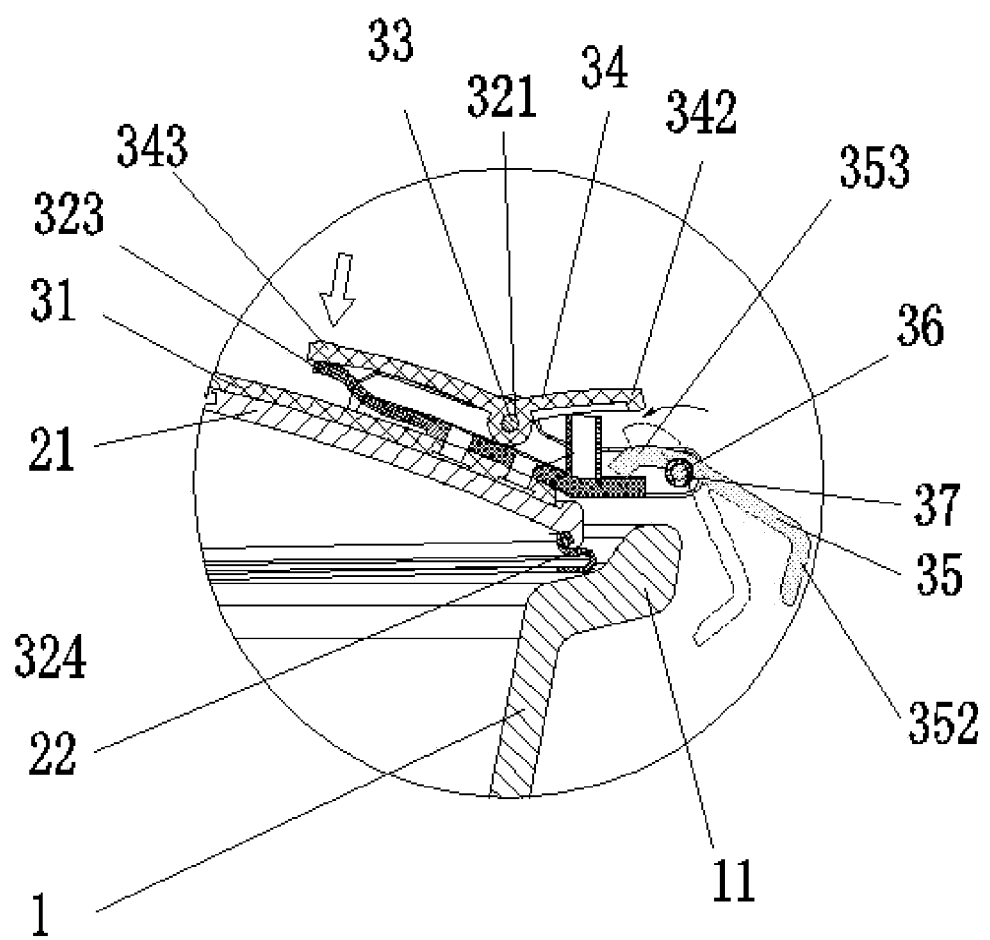
FIG. 6 is a cross-sectional partial view of the first embodiment of the slow cooker when the lock is rotated to an unlocking state to unlock.

As shown in FIG. 5, when the rear end button 343 (free end) of the unlocking button 34 that is close to the connector 31 is pressed down, the elastic support sheet 323 of the locking seat is compressed. The unlocking button 34 then rotates counterclockwise due to the leverage of the first pin 33. Then the front support block 342 of the unlocking button 34 moves upward, relieving the interference with the arcuated support block 353. As shown in FIG. 6, the arcuated support block 353 then detaches from the front support block 342, and rotates counterclockwise around the second pin 36 due to the elastic force provided by the torsion spring 37, from the dashed line position to the solid line position. An "L" shaped lock position 352 in the lower end of the lock moves outward and thus the interference thereof with the rim 11 of the liner container can be relieved. The unlocking button 34 resets because of the elastic support sheet 323 and the rigid support pillar 324 retains the unlocking button 34 in a certain state when the elastic support sheet moves back to a certain position. Now it is in the unlocking state, the locking assembly 3 can be lifted up and the pressure of the lid component 2 is released, therefore the lid component 2 can be taken out and the slow cooker can be opened.

Figure 7:
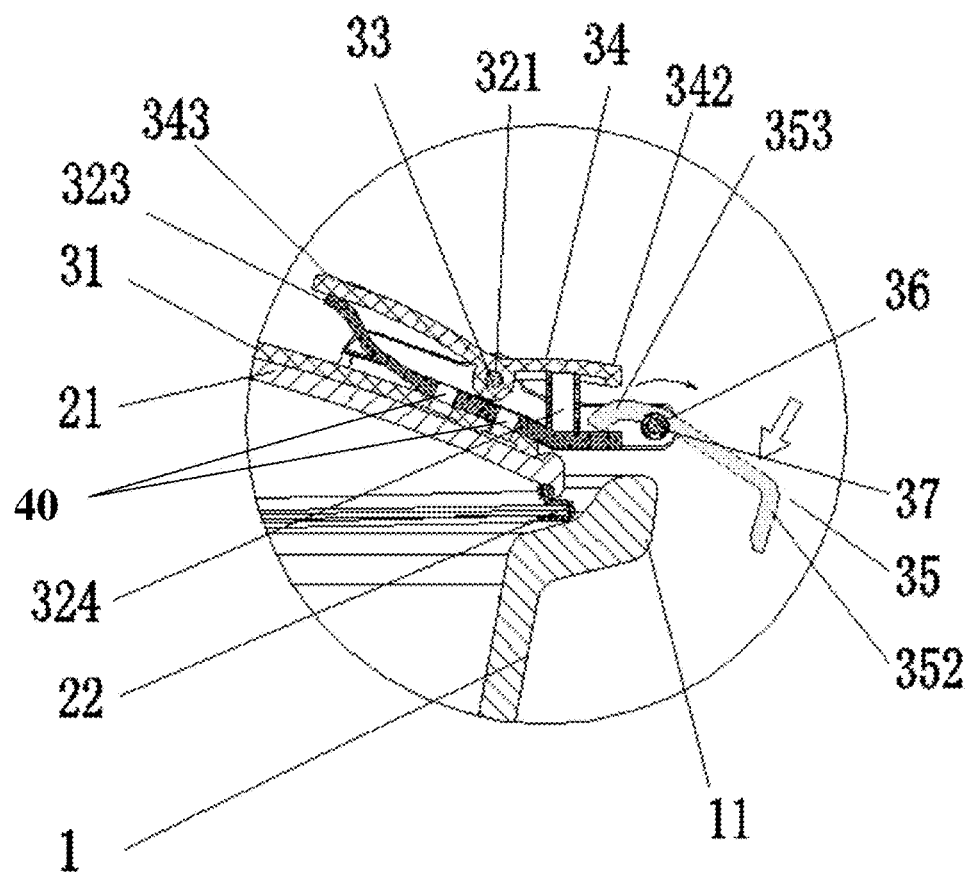
FIG. 7 is a cross-sectional partial view of the first embodiment of the slow cooker in an unlocking process.

As shown in FIG. 7, to lock the lid component with the liner container, the "L" shaped lock position 352 in the lower end of the lock 35 can be pressed down and rotates clockwise around the second pin 36. The arcuated support block 353 keeps in touch with the front support block 342 of the unlocking button 34 and forces the unlocking button to rotate counterclockwise. The elastic support sheet 323 is pressed to deform and thus a prestressing force to flick back is generated. When the lock 35 rotates to a certain angle, the arcuated support block 353 detaches from the front support block 342 of the unlocking button 34. Then the unlocking button 34 rotates back under the back-flicking force of the elastic support sheet 323. After resetting of the unlocking button, the front support block 342 of the unlocking button forms an interference with the arcuated support block 353 in the upper end of the lock, counteracting the back-flicking force of the torsion spring 37. The "L" shaped lock position 352 in the lower end of the lock can be retained in engagement with the rim 11 of the liner container, limiting the up-movement of the lid component 2, to engage the lid component with the liner container.

Figure 8:
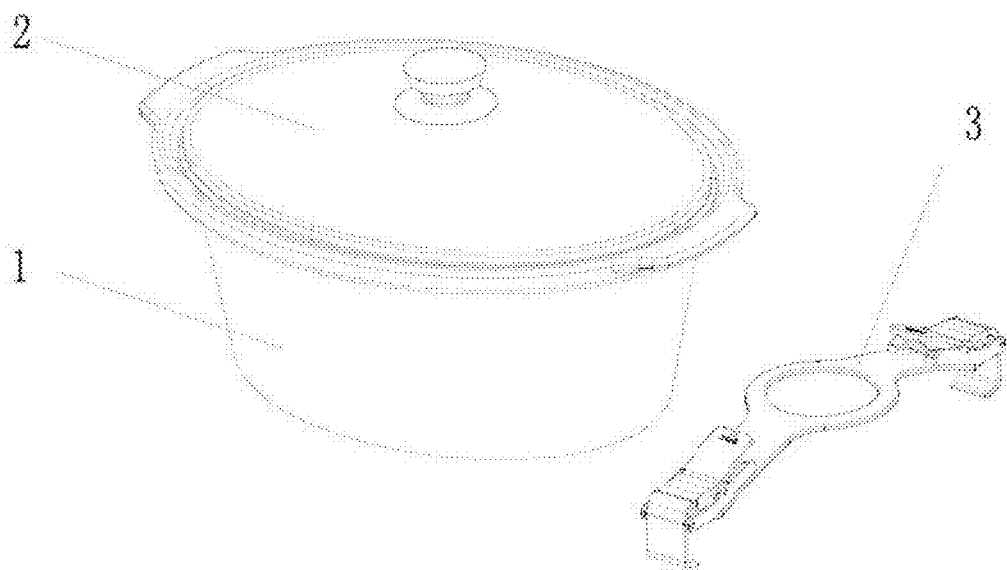
FIG. 8 is a schematic view of the first embodiment of the slow cooker when the locking assembly is removed.
Figure 9:
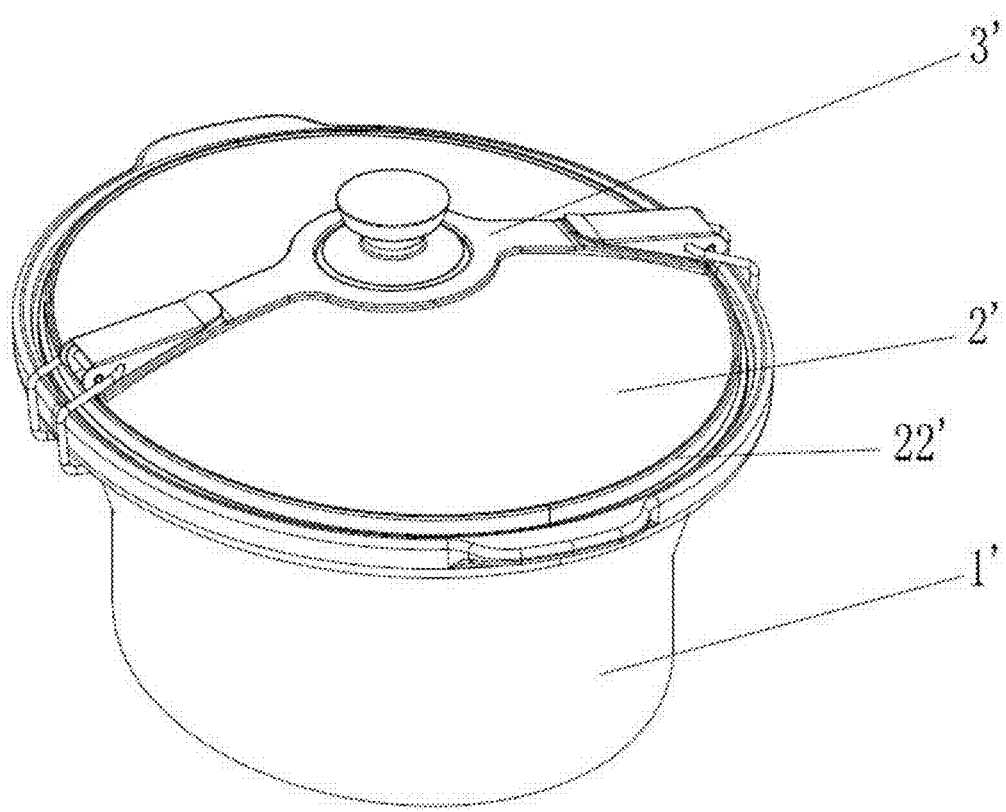
FIG. 9 is a schematic view of a second embodiment of the slow cooker (not showing the housing).
Figure 10:
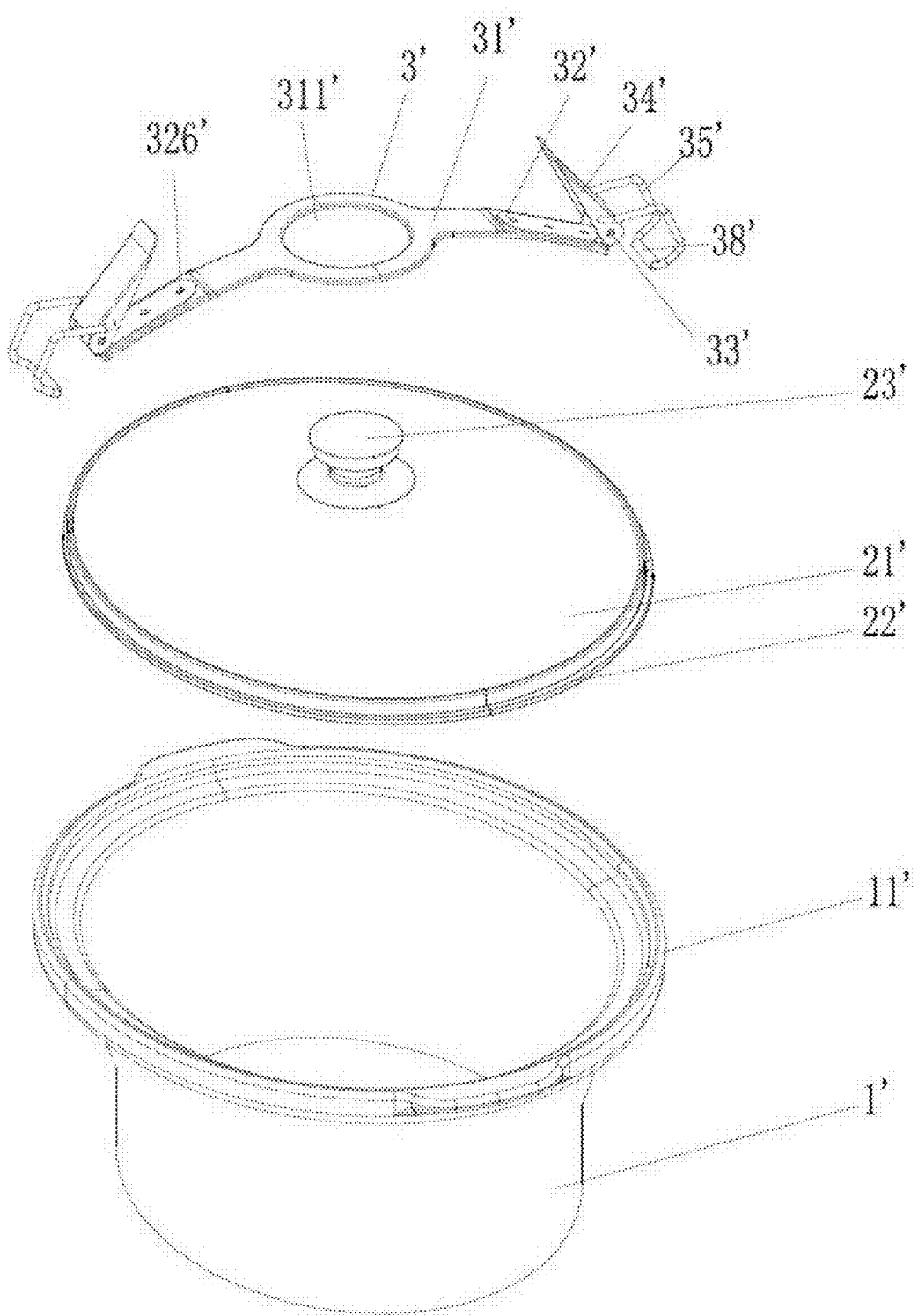
FIG. 10 is an exploded view of the second embodiment of the slow cooker.
Figure 11:
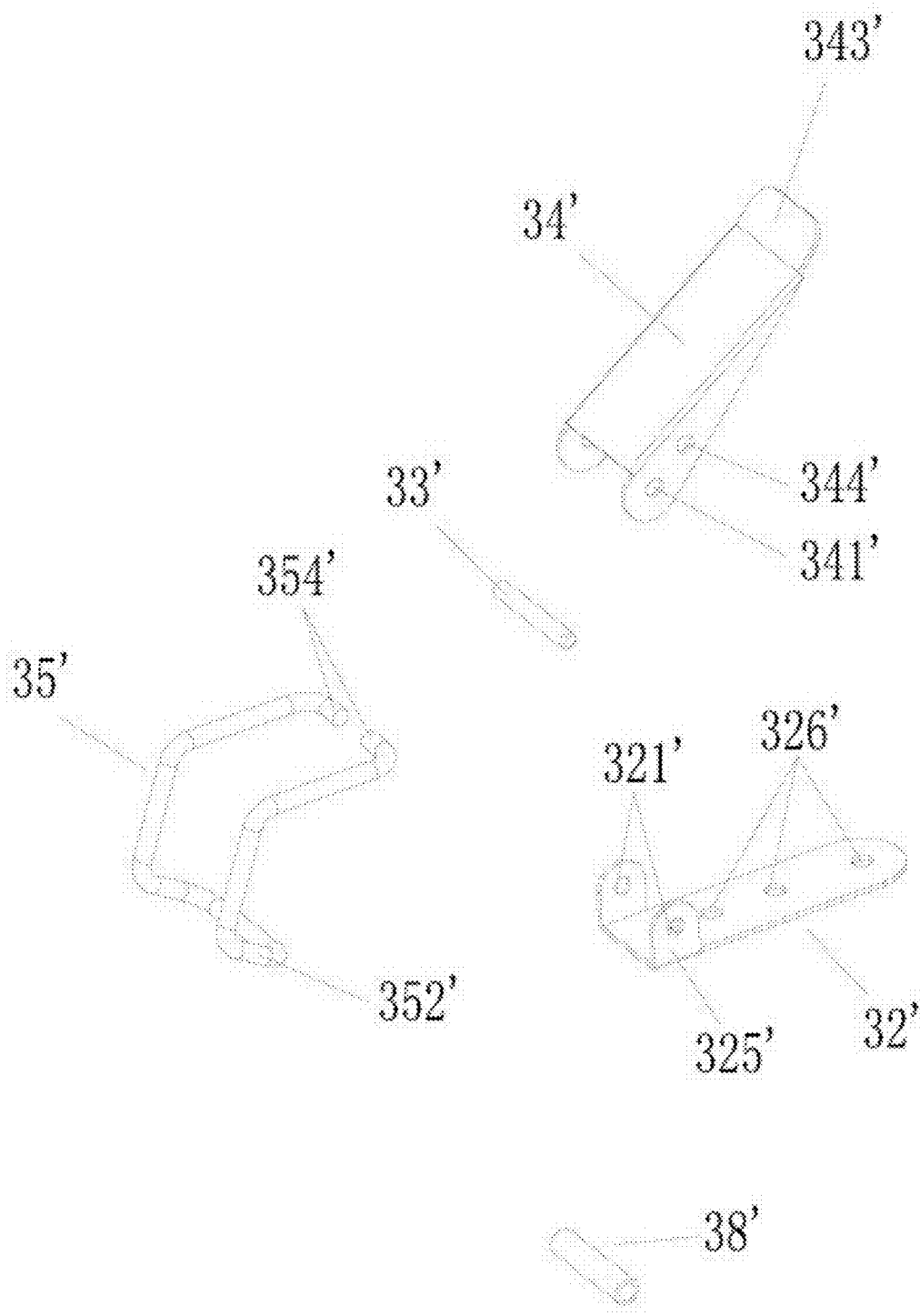
FIG. 11 is an exploded view of the locking assembly of the second embodiment of the slow cooker.

The locking assembly 3 in the present embodiment is a detachable structure and can be detached from the lid component 2. As shown in FIG. 8, the locking assembly 3 can be opened and entirely taken off, to facilitate the cleaning of the lid component. Also, the locking assembly 3 thus can be used for other slow cooker products, so multiple slow cookers can share one locking assembly. A locking assembly in such design can be produced or sold as one component of a slow cooker independently. It is also easy to repair or replace the locking assembly after destroy of it.

The locking assembly 3 can also be designed as a non-detachable structure, such as, a structure fixed on the lid in the form of riveting, screwing or other forms, which can also lock or unlock the lid component 2 with the liner container 1.

The connector 31 in the present embodiment has a fixing hole, and the locking seat 32 has several through-holes in the center, disposed certain distance from each other correspondingly. The locking seat 32 can be engaged with different positions of the connector 31 by fastening any one of the through-holes of the locking seat with the fixing hole by a fastener 40, to adjust the length of the locking assembly 3 in different levels. In such design, the length of the locking assembly 3 can be adjusted based on different volume sizes of liner containers 2, which increases the versatility of the component and lowers the cost.

In the present embodiment, the unlocking button 34 rotates back under the back-flicking force of the elastic support sheet 323, thus the unlocking button forms an interference with the arcuated support block 353 in the upper end of the lock. To achieve the same effect, the elastic support sheet 323 of the locking seat 32 can be replaced by a torsion spring disposed around the first pin 33, so the unlocking button 34 can reset under the elastic force of the torsion spring.

While the locking assembly 3 in the present embodiment includes two locking end components and the two locking end components share the same structure, the two locking end components can also be designed into two different structures, provided the locking end components can selectively engage the lid with the liner container.

The locking assembly 3 can also be designed to comprise three, four or more locking end components.

While the locking assembly 3 in the present embodiment can be used independently, two, three or more locking assemblies can be used in combination, such that the lid of the slow cooker can be engaged with the liner container by two, four or more locking end components.

The lid handle 23 in the present embodiment is in a ball shape, and the locking assembly keeps away from the lid handle 23 by the hole 311 and then compresses the lid. As for a lid handle in an arch shape, the connector 31 can either keep away from the lid handle by a hole, or directly pass through below the lid handle without a hole.

The slow cooker according to the present embodiment has a novel structure, convenient operation, stable performance and high reliability.

Embodiment 2

As shown in FIGS. 9 to 17, it is different from the first embodiment that, each of the locking end components of the slow cooker according to the present embodiment comprises a locking seat 32', a first pin 33', an unlocking button 34', a lock 35' and a sleeve 38'. The locking seat 32' includes a support rib 325' disposed far from the connector, and the support rib 325' has a first pin hole 321'. The unlocking button 34' includes a button pin hole 341' corresponding to the first pin hole 321', and is connected with locking seat 32' by the first pin 33', and can rotate within a certain range. The unlocking button 34' comprises an assembly hole 344' disposed close to the button pin hole 341', and a rear end button 343' (free end) disposed on the end opposed to the button pin hole 341' which can be pulled up.

The lock 35' comprises two hook-shaped pins 354' oppositely disposed in the upper end, and an "L" shaped lock position 352' in the lower end. The pins 354' respectively hook the assembly holes 344' in the unlocking button, allowing the lock 35' to be connected with the unlocking button 34' and rotate within a certain range. The "L" shaped lock position 352' is capable of selectively engaging with the rim 11' of the liner container, so as to engage the lid component with the liner container. The sleeve 38' is disposed around the center position of the "L" shaped lock position 352'.

The present embodiment locks and unlocks the lid with the liner container in ways as follows.

Figure 12:
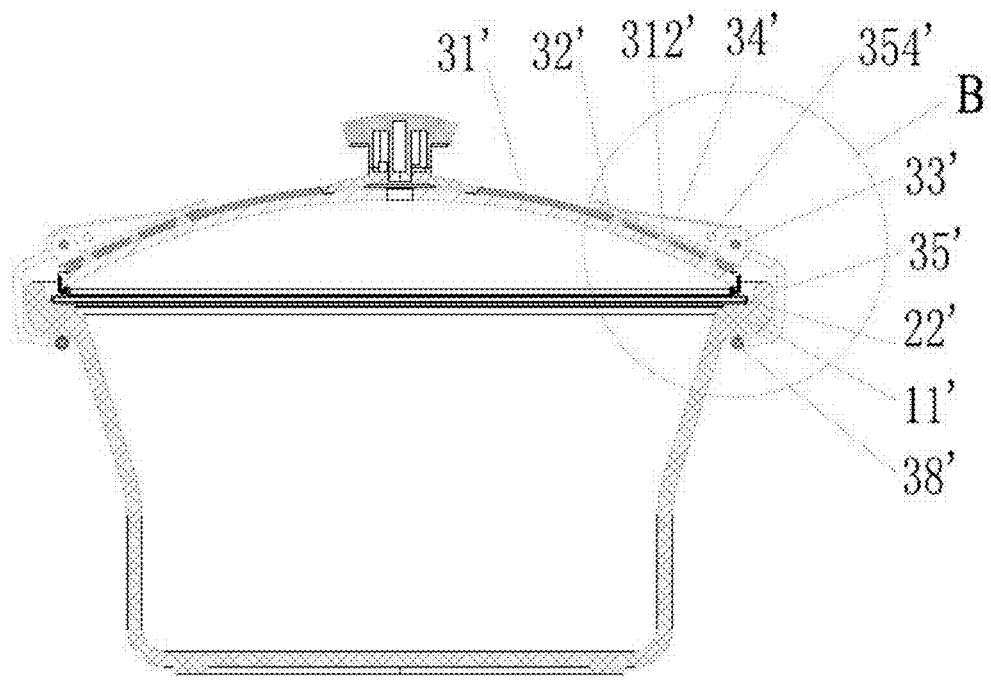
FIG. 12 is a cross-sectional view of the second embodiment of the slow cooker when the lid is in a locking state.
Figure 13:
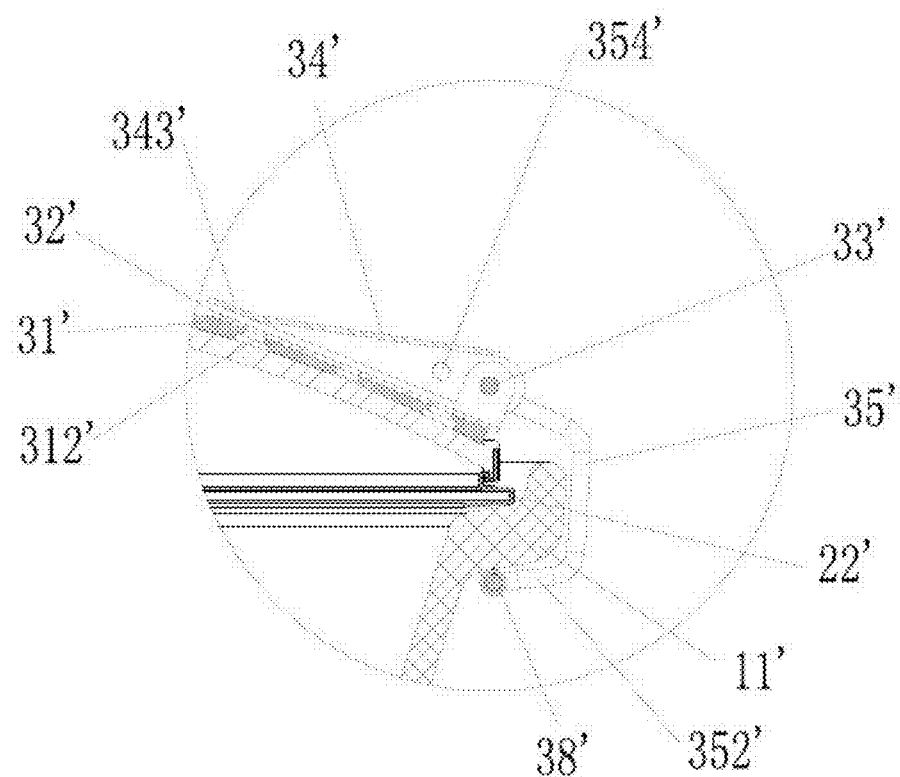
FIG. 13 is an enlarged view of portion B in FIG. 12.

As shown in FIGS. 12 and 13, in a locking state, the locking assembly 3' is disposed on the lid component 2'. The unlocking button 34' is connected with the locking seat 32' by the matching of the button pin hole 341', the first pin 33' and the first pin hole 321'. The lock 35' is stuck in the assembly holes 344' of the unlocking button 34' by the pins 354'. The sealing ring 22' is compressed by the locking assembly and has a prestressing force to move upward, forcing the lock 35' to form an interference with the rim 11' of the liner container and preventing the lid component 2' from opening. Then the locking assembly 3' compresses the lid component 2', such that the liner container 1', the lid component 2' and the sealing ring 22' form a confined space by the elasticity of the sealing ring 22', so as to inhibit leakage of soup and drop of the lid component 2'.

Figure 14:
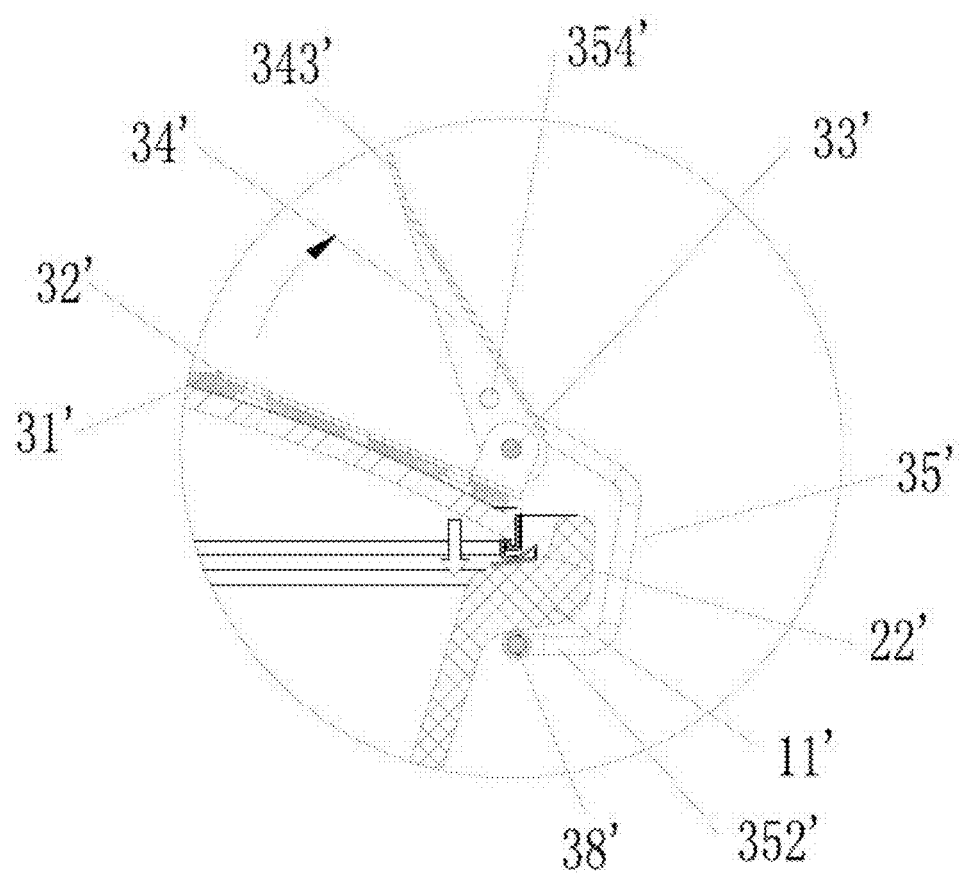
FIG. 14 is a cross-sectional partial view of the second embodiment of the slow cooker when the unlocking button is pulled to unlock.
Figure 15:
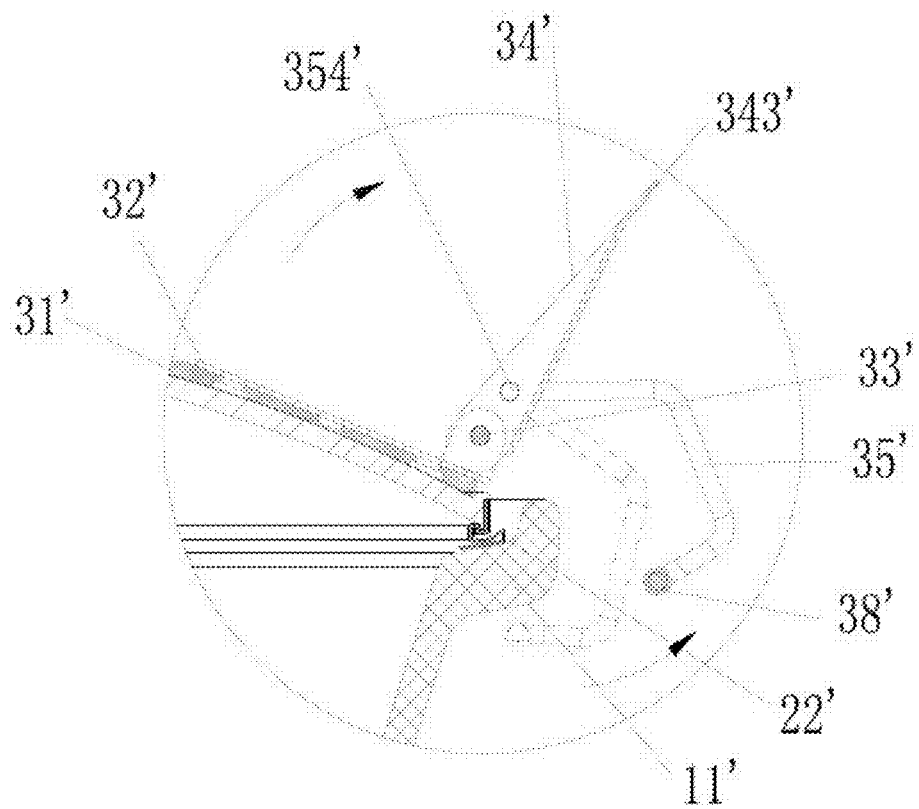
FIG. 15 is a schematic view of the rotating direction of the lock when the unlocking button is pulled to a certain position.
Figure 16:
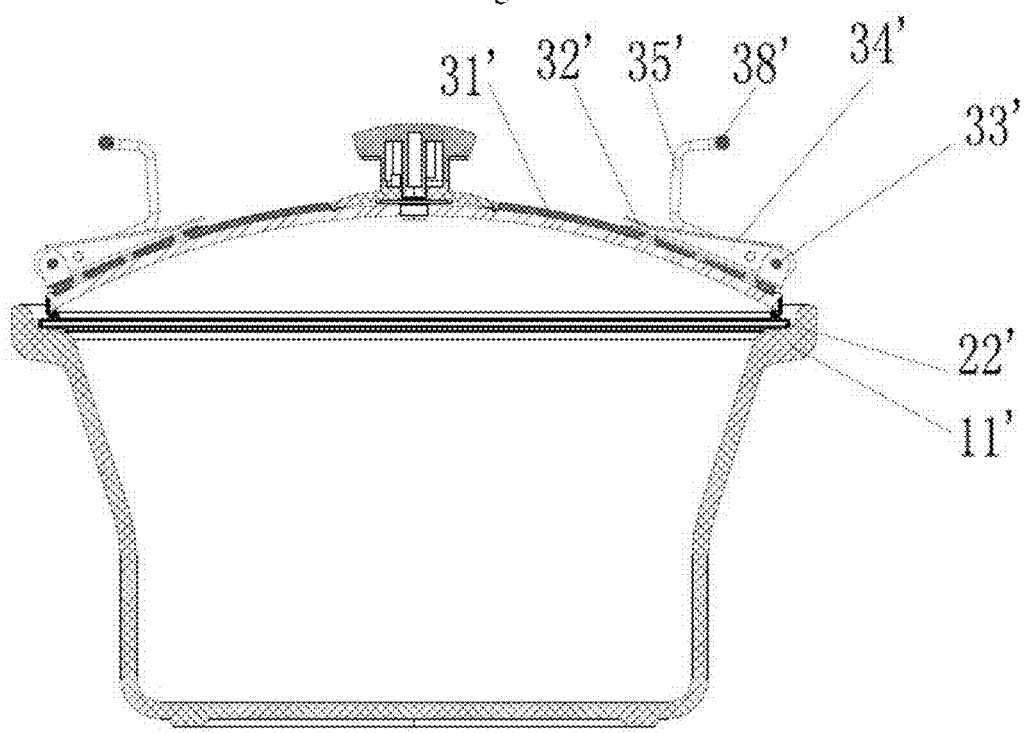
FIG. 16 is a cross-sectional partial view of the second embodiment of the slow cooker when the lock is rotated to an unlocking state to unlock.
Figure 17:
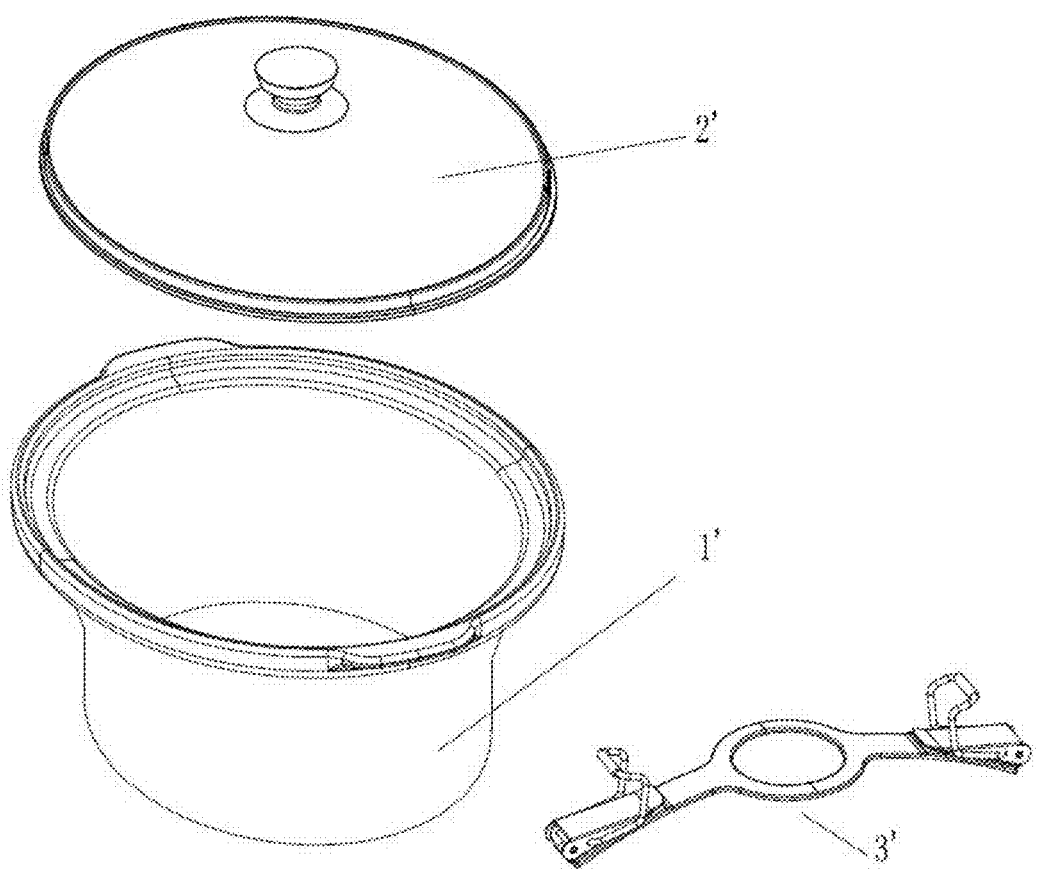
FIG. 17 is a schematic view of the second embodiment of the slow cooker when the locking assembly is removed.
Figure 18:
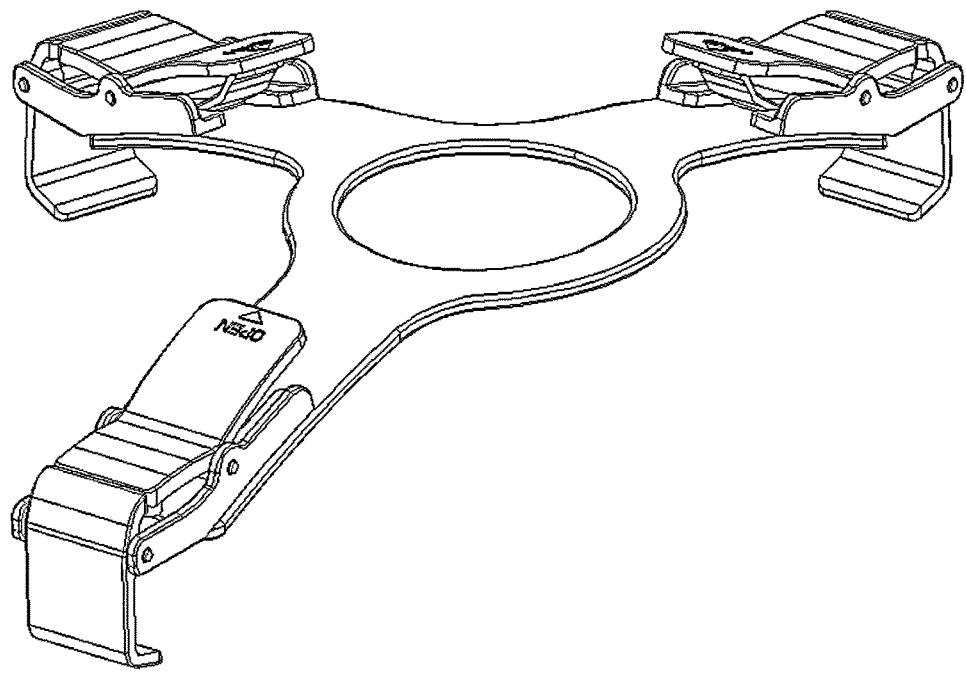
FIG. 18 shows exemplary Y shape and H shape connectors.
Figure 18:
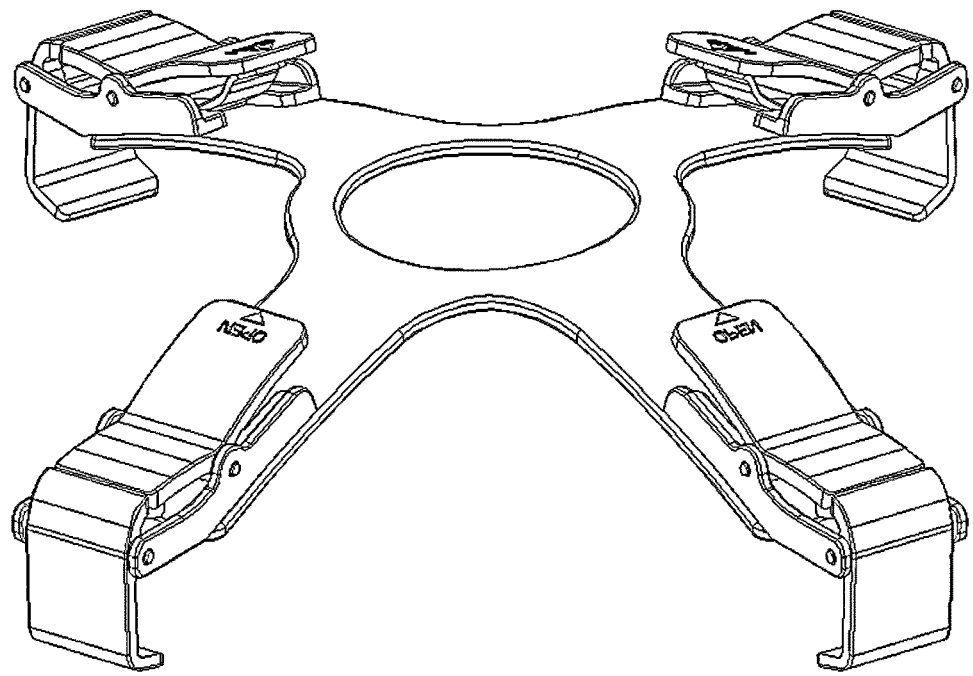

As shown in FIG. 14, in order to open the lid component 2', the rear end button 343' of the unlocking button 34' should be pulled up first, the unlocking button 34' then rotates clockwise around the first pin 33'. The sealing ring 22' is compressed under the pulling force of the lock 35', and the lid component 2' moves downward, allowing the unlocking button 34' to continually rotate upward. After the highest point of the rotation, the distance between the assembly holes 344' and the underside of the rim 11' of the liner container gradually shortens, and finally relieves the interference between the lock 35' and the liner container 2', allowing the lock 35' to rotate outward, as shown in FIG. 15, from the dashed line position to the solid line position. Then the locking assembly 3' is not restricted in the upward or downward direction and thus can be taken off from upside. As shown in the FIG. 16, the lock 35' and the unlocking button 34' can continually rotate to lay on the locking seat 32', to facilitate taking up and lying down.

In order to lock the lid component with the liner container, the lid component 2' can be placed on the liner container 1' first. Then the locking assembly 3' can be placed on the lid component 2'. When the unlocking button 34' is pulled outward, the lock 35' is free and thus the "L" shaped lock position 352' in the lower end of the lock can be engaged with the rim 11' of the liner container, and the unlocking button 34' can be rotated to the opposite direction at the same time. Before the highest point of the rotation of the unlocking button 34', the locking seat 32' moves downward under the pulling force of the lock 35', compressing the sealing ring 22' to deform and generating a prestressing force. After the highest point of the rotation of the unlocking button 34', the unlocking button 34' automatically resets under the up-pushing prestressing force of the sealing ring 22', forcing the lock 35' to form an interference with the rim 11' of the liner container and preventing the lid component 2' from opening, so as to engage the lid component with the liner container.

The connector in the present embodiment has a fixing hole 312', and the locking seat has several through-holes 326' in the center, disposed certain distance from each other correspondingly. The locking seat can be engaged with different position of the connector by fastening any one of the through-holes 326' of the locking seat with the fixing hole 312' by a fastener, to adjust the length of the locking assembly in different levels. In such design, the length of the locking assembly can be adjusted based on different volume sizes of liner containers, which increases the versatility of the component and lowers the cost.

What is claimed is:

1. A slow cooker comprising a liner container, a lid and a locking assembly, the locking assembly retaining the lid on an opening of the liner container, wherein
    the liner container has a rim projecting outside at the opening,
    the locking assembly comprises a connector disposed on the lid for engaging the lid with the opening of the liner container, and locking end components provided at ends of the connector for engaging the rim of the liner container,
    each of the locking end components comprises an unlocking button connected with the connector by first pin and a lock connected with the connector by a second pin, wherein
        an elastic support sheet or torsion spring is disposed under the unlocking button for retaining the unlocking button in a locking state, and a torsion spring is disposed under the lock for retaining the lock in an unlocking state,
        the lock has a free upper end and a lower end, wherein the lower end is provided with a lock position for engaging the rim of the liner container, and
        the unlocking button has a front support block and a free rear end, wherein the front support block supports the free upper end of the lock, and
    the locking assembly has an elongated, a Y shape or an H shape.

2. The slow cooker according to claim 1, wherein the slow cooker comprises at least one locking assembly detachable from the liner container and the lid.

3. A locking assembly detachable from a liner container and a lid, wherein
    the locking assembly comprises a connector disposed on the lid for engaging the lid with an opening of the liner container, and locking end components provided at ends of the connector for engaging a rim of the liner container,
    each of the locking end components comprises an unlocking button connected with the connector by first pin and a lock connected with the connector by a second pin, wherein
        an elastic support sheet or torsion spring is disposed under the unlocking button for retaining the unlocking button in a locking state, and a torsion spring is disposed under the lock for retaining the lock in an unlocking state,
        the lock has a free upper end and a lower end, wherein the lower end is provided with a lock position for engaging the rim of the liner container, and
        the unlocking button has a front support block and a free rear end, wherein the front support block supports the free upper end of the lock, and
    the locking assembly has an elongated, a Y shape or an H shape.

4. The slow cooker according to claim 1, wherein at least one of the locking end components is connected with the connector by a positioning structure used for adjusting length of the locking assembly.

5. The locking assembly according to claim 3, wherein at least one of the locking end components is connected with the connector by a positioning structure used for adjusting length of the locking assembly.

\* \* \* \* \*